United States Patent [19]

Kaule et al.

[11] Patent Number: 5,509,691
[45] Date of Patent: Apr. 23, 1996

[54] SECURITY ELEMENT IN THE FORM OF THREADS OR STRIPS TO BE EMBEDDED IN SECURITY DOCUMENTS AND A METHOD FOR PRODUCING AND TESTING THE SAME

[75] Inventors: Wittich Kaule, Emmering; Wilhelm Ilgmann, Wolfratshausen; Gerhard Schwenk, Puchheim; Gerhard Stenzel, München, all of Germany

[73] Assignee: GAO Gesellschaft für Automation und Organisation mbH, Germany

[21] Appl. No.: 192,610

[22] Filed: Feb. 7, 1994

Related U.S. Application Data

[63] Continuation of Ser. No. 966,546, Oct. 26, 1992, Pat. No. 5,324,079.

[51] Int. Cl.⁶ ................................................. B42D 15/00
[52] U.S. Cl. ................................................. 283/67; 283/83
[58] Field of Search .................................. 283/70, 74, 67, 283/83, 84, 85, 901, 904

[56] References Cited

U.S. PATENT DOCUMENTS

| | | | |
|---|---|---|---|
| 4,183,989 | 1/1980 | Tooth | 428/195 |
| 4,204,706 | 5/1980 | Blum et al. | 283/81 |
| 4,446,173 | 5/1984 | Barrell et al. | 427/206 |
| 4,501,960 | 2/1985 | Jouvet et al. | 283/83 X |
| 4,522,428 | 6/1985 | Small et al. | 283/83 X |
| 4,587,161 | 5/1986 | Barrell et al. | 428/288 |
| 4,756,557 | 7/1988 | Kaule et al. | 283/85 |
| 4,763,927 | 8/1988 | Schneider | 283/83 X |
| 5,324,079 | 6/1994 | Kaule et al. | 283/83 |

*Primary Examiner*—Willmon Fridie, Jr.
*Attorney, Agent, or Firm*—Bacon & Thomas

[57] ABSTRACT

A security element that can be embedded in the form of a thread or strip in a security document, in particular a paper of value, is composed of two carrier sheets, each of which bears each of the marking substances allowing for detection of authenticity. The two carrier sheets are put together in such a way that the marking substances to be protected from mechanical abrasion and other external influences come to lie on the inside.

The thread not only offers special protection for the marking substances, but can also be embedded in the paper substance easily due to its symmetrical structure and without showing any tendency to curl.

5 Claims, 1 Drawing Sheet

SECURITY ELEMENT IN THE FORM OF THREADS OR STRIPS TO BE EMBEDDED IN SECURITY DOCUMENTS AND A METHOD FOR PRODUCING AND TESTING THE SAME

This application is a Division of application Ser. No. 07/966,546, filed Oct. 26, 1992 now U.S. Pat. No. 5,324,019.

BACKGROUND OF THE INVENTION

The present invention relates to a security element in the form of a thread or strip to be embedded in a security document comprising a carrier sheet and at least one marking substance applied thereto. e.g. in the form of a coating, to allow for visual and/or machine detection of authenticity, and to a method for producing and testing the same.

It is a known measure to protect security documents by embedding in these documents security elements which either have special machine detectable physical properties or are designed in terms of their visual appearance so as to serve as an authenticity feature for the security document. Such security elements are e.g. threads or strips directly embedded in the paper ply as it is being formed during the manufacture of the paper.

Such a security thread is known e.g. from German laid open print no. 27 54 267, whereby a carrier sheet made of polyester or cellulose is coated with various materials. The visually and/or machine readable authenticity features are e.g. an aluminized coating, a magnetic coating, a coating of X-ray absorbent material and/or luminescent material.

This publication shows various structures of such security threads which differ in their layer arrangement and/or the materials used thereby. However, all examples shown therein have at least one, usually even several, of the disadvantages stated below.

For example, the layer materials susceptible to mechanical abrasion and atmospheric influences, such as the metal coating, usually form the outside of the thread. However, mechanical stresses during production of the thread can easily destroy the metal coating, and during subsequent use it is often the case that the metal coaxing loses its original shine and eventually turns dull. In serious cases the metal layer may even be completely interrupted, so that the security thread loses not only its reflectiveness but also its machine testable electrical conductivity over the entire length of the thread.

Furthermore, the structure is usually asymmetrical and this asymmetry leads to curling of the thread and the formation of garlands. Thus, the thread cannot always be embedded readily in the same flat position in the fibrous layer of a paper ply being formed. The areas of the paper web in which the security thread does not come to lie on the plane of the paper ply must subsequently be eliminated as being useless. This reject rate leads to higher costs for the paper production.

Finally, manufacturing errors in the coating process cannot be ruled out. For example, there may be wide fluctuations in the layer thickness and also complete interruptions In the coating. Such interruptions in a metal layer, for example, result in an interruption of the electrical conductivity. These security documents must also be eliminated as rejects since these irregularities prevent reliable detection of authenticity.

SUMMARY OF THE INVENTION

The invention is based on the problem of providing a security element that avoids the above disadvantages while being easy to produce and adapted to be embedded in a security document.

This problem is solved by the feature stated in the characterizing part of the main claim. A method for producing such security elements is the object of an independent claim.

The inventive composition of the security thread from two similarly pretreated sheets gives the thread a completely symmetrical structure. The two carrier sheets are preferably obtained from the same sheet by first preparing a large stretch of sheet, providing it with the appropriate coatings in a coating apparatus, cutting the sheet into two longitudinal strips and superimposing and interconnecting these strips in the inventive form. This avoids fluctuations which could occur if the strips of sheet were produced In two different production sequences.

The security thread, which is removed from a roll during paper production and fed to the mold at a predetermined place in the pulp, maintains its position along this path, on which it is directed freely, without turning about its longitudinal axis. This avoids the rejects which occur with threads having an asymmetric structure due to a lack of flatness of the thread on the paper plane.

The transfer of the sensitive layers into the inner areas of the security thread also allows for the use of materials which can virtually not be used in the prior art due to their exposed position and their lack of resistance to environmental influences.

Furthermore, each layer containing a marking substance is present twice. The lack of a marking substance in one layer does not lead to a total absence of the authenticity feature, except in the improbable case that the substance is also lacking at the same place in the matching layer. If the marking substance is lacking in one layer, the amount of substance is only half as great but this reduction in the amount can be readily compensated by appropriate design of the detecting apparatus.

The two carrier sheets are generally interconnected by an adhesive layer, whereby suitable adhesives must be selected depending on the given conditions. For example, if the two inside layers are metal layers and authenticity is to be detected by testing the electrical conductivity, one will preferably use an adhesive material that is interspersed with electrically conductive pigments. These electrically conductive pigments result in an electrical connection between the two metal layers. If the metal layer breaks during production of the sheet or during embedding of the security thread in the paper, the adhesive layer serves as a bridging member, maintaining the electrical connection over the entire length of the security element.

While a magnetic layer, being subject to abrasion, is preferably transferred to the inside, resistant coatings such as layers of varnish or paint, for example, can also be provided on the outside of the plastic layer, especially since plastic surfaces can generally be printed on better than e.g. metal surfaces.

The inside coatings can be made appropriately thin, since they are sufficiently protected from mechanical stresses by the outer plastic sheets.

In a preferred embodiment, the metal layer is first applied during production of the carrier sheets, and the magnetic layer applied only to this metal layer. After the two sheets are superimposed, the metallically reflecting layer thus covers the magnetic layer whose inherent color 1s black or brown. This thread can then also be embedded in the printed area of the security document, since the thread cannot be seen, or appears only as a rather light area, in incident light due to its reflecting surface and thus does not impair the visual impression of the printed pattern. Only when regarded in transmitted light is this thread recognizable as a dark strip in the paper. These differences between observation in incident and transmitted light are also a simple means for distinguishing the document from a copy.

The security threads may also be embedded in the document by methods known as such so as to appear in certain places on the surface. This makes a particular advantage of the invention apparent. Due to the locally exposed position of the security thread on the surface of the document, the thread is subject in these places to particular mechanical stresses resulting from daily use. However, the outer layers of the inventive security thread are formed by plastic layers, such as e.g. polyester sheets, which are resistant to mechanical and chemical influences and protect the sensitive feature layers. The thread thus shows no signs of wear in spite of its exposed position.

The double presence of a marking substance can be utilized advantageously for authenticity testing if a metal or electrically conductive coating is used.

In the case of known security threads, which contain only one electrically conductive layer, cracks in the metal coating cause an interruption in conductivity. Noncontact detection of conductivity by known methods (German patent no. 17 74 209) therefore produced a negative result. With the inventive solution, two conductive layers are now present which are capacitively coupled by a nonconductive layer (plastic sheet, adhesive layer, etc.) forming a dielectric. If cracks occur in the metal layers, the metal layers interrupted by these cracks act, with the dielectric therebetween, like capacitors connected in series. This maintains an a.c. conductivity if one can assume that the two metal layers are not completely interrupted at the same place in the thread. If this a.c. conductivity is measured by capacitive measuring methods known as such, the presence of two electrically conductive layers can be inferred, and this feature indicating authenticity clearly detected, even if there are one or more breaks in one or both metal coatings.

DESCRIPTION OF RELATED ART

Further advantages and advantageous developments can be found in the description of preferred embodiments of the invention with reference to the figures, in which

DETAILED DESCRIPTION OF THE PREFERRED EMBODIMENTS

Figure 1:
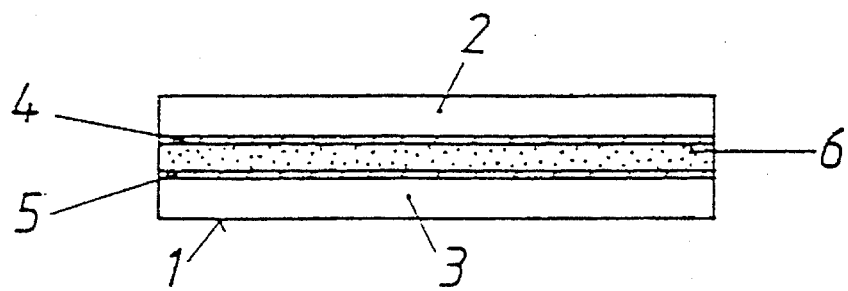
FIGS. 1 and 2 show cross-sectional views of various embodiments of inventive security elements.

FIG. 1 shows a simple embodiment of an inventive security thread 1. The carrier sheets are the two outside transparent plastic sheets 2, 3 preferably made of polyester. Each of these plastic sheets is provided on the inside with a metal coating 4, 5. For this purpose the sheets are coated with a layer of aluminum, nickel or chromium by suitable methods (metalizing, spraying, sputtering. etc.). The layer thickness is generally far below one micron. These two carrier sheets are connected after coating by an adhesive layer 6. Suitable adhesives are e.g. laminating glues which are activated by heat in a certain temperature range, or polymerization glues which harden when subjected to heat and/or UV radiation.

This thread has high reflecting properties due to its metal coating and is therefore recognizable as a dark stripe only in transmitted light since, when it is regarded in incident light, the light reflected by the thread is scattered through the paper layer thereabove. The outer polyester sheets make the thread resistant to a great number of chemical solvents and also allow it to meet the requirements in terms of high flexibility and tearing strength due to the excellent mechanical properties of polyester.

Figure 2:
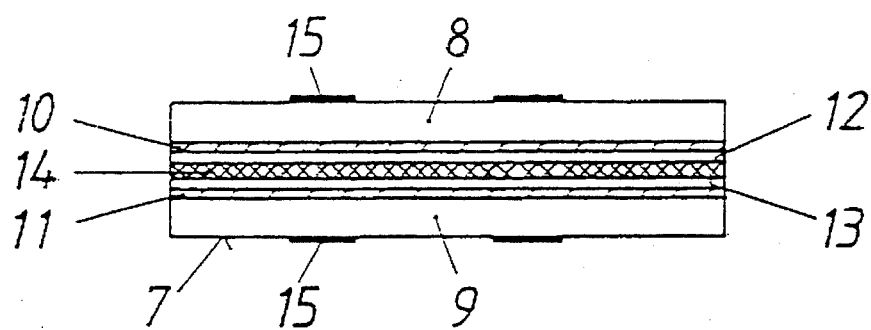

FIG. 2 shows a thread In which the layer materials serving the detection of authenticity are embedded, again between two polyester sheets 8, 9. Each of these sheets was first provided with a metal coating 10, 11 and a magnetic layer 12, 13 was applied to this metal coating. Suitable magnetic materials or coating materials are known from German patent no. 16 69 245. Here, too, the two carrier sheets are superimposed with their coated sides facing the inside, and interconnected with the aid of an adhesive layer 14. The adhesive layer must be adapted to a good bond between the magnetic layers on the inside.

In some cases, in particular when a plurality of layers are to be contained in the security thread, the sheets may also be coated on both sides. In this case, at least one of the layer materials comes to lie on the outside. For these outside layers 15 one should therefore select materials which withstand chemical and mechanical stresses. One can use e.g. a varnish coating over the entire surface which possesses a certain color or else luminescent properties. One may also print a pattern or alphanumeric characters which are readable directly or with the aid of appropriate enlarging devices. Since the threads generally have a width of 0.5 mm to a maximum of 1.5 mm. elaborate printing techniques and corresponding apparatus are necessary for printing characters of this size on the thread which gives the thread additional protection from forgery.

Figure 3:
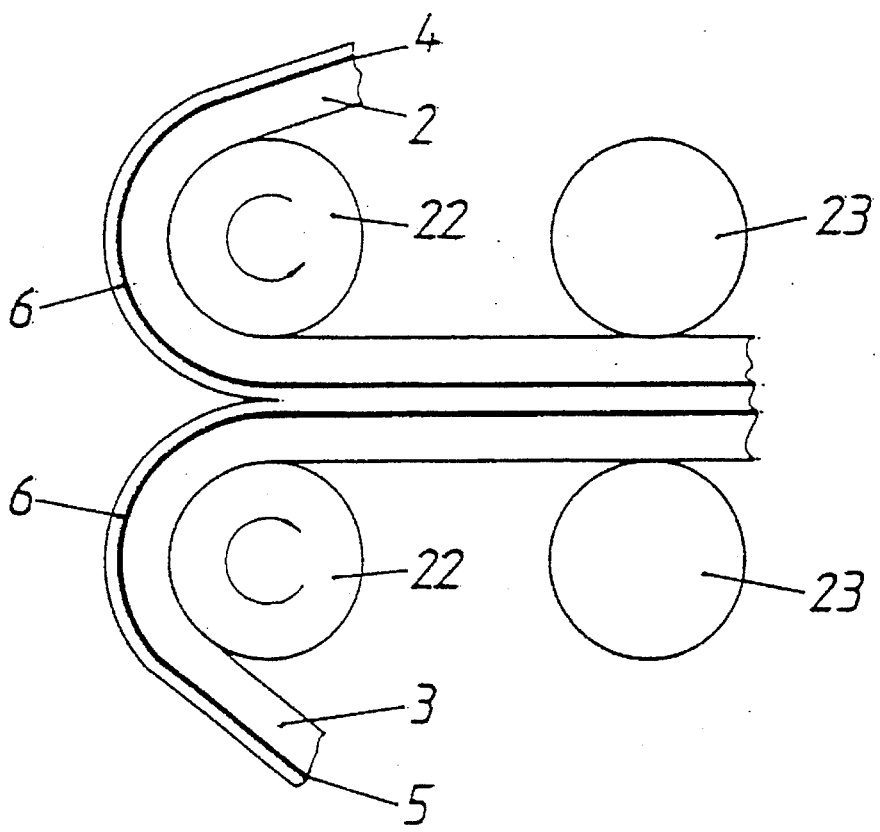
FIG. 3 shows a schematic view of the production method.

The two carrier sheets of which the inventive security thread is composed are preferably obtained from one sheet which is provided beforehand with the desired layers on one or both sides. The side of sheet bearing the coating that will later be on the inside is additionally provided with an adhesive surface. The desired two-ply stretch of sheet is obtained by folding the sheet or cutting it in two and appropriately superimposing the halves. The two sheets can be firmly connected by being passed through a roller laminating apparatus known as such (FIG. 3). This apparatus superimposes sheets 2, 3 with e.g. metal coatings 4, 5 facing each other and heats them by heating rollers 22, infrared or high frequency to a temperature at which adhesive 6 is activated. After passing through two pressing rollers 23 and subsequent cooling, the two sheets are firmly interconnected and can be cut in an appropriate cutting apparatus into individual strips having the desired width.

We claim:

1. A method for producing a security element in the form of a thread or strip to be embedded in the security document comprising a carrier sheet and at least one marking substance applied thereto to allow for visual and or machine detection of authenticity, characterized by the steps of preparing a plastic sheet, providing this plastic sheet with the substance allowing for detection of authenticity, producing a second, similarly pretreated sheet, providing at least one of the sheets with a laminating adhesive on a side provided with marking substance, superimposing the two sheets with their sides provided with marking substance or with the adhesive layer facing each other, and gluing them together, and cutting the security elements out of this two ply stretch of sheet in the necessary strip or thread width.

2. The method of claim 1, characterized in that the two plastic sheets are obtained from one stretch of sheet.

3. The method of claim 2, characterized in that this stretch of sheet is cut into two longitudinal strips after application of the marking substances to form the two plastic sheets.

4. The method of any of claim 1, characterized in that the plastic sheets are coated several times with different materials.

5. The method of claim 4, characterized in that the various coatings are applied to the same side of the sheet.

* * * * *